(12) United States Patent
Dale et al.

(10) Patent No.: US 8,483,122 B2
(45) Date of Patent: *Jul. 9, 2013

(54) DOWNSTREAM TIME DOMAIN BASED ADAPTIVE MODULATION FOR DOCSIS BASED APPLICATIONS

(75) Inventors: Mark Dale, Laguna Hills, CA (US); Hebsgaard Anders, Lawrenceville, GA (US); David Hartman, Laguna Hills, CA (US); Alan Kwentus, Coto de Caza, CA (US); Steven Jaffe, Irvine, CA (US); Kelly Cameron, Irvine, CA (US); Stephen Krafft, Los Angeles, CA (US); Alan Gin, Corona Del Mar, CA (US); Jen-chieh (Jack) Chien, Lake Forest, CA (US); Dorothy Lin, Laguna Beach, CA (US); Rocco Brescia, Newport Coast, CA (US); Joyce Wang, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 510 days.

This patent is subject to a terminal disclaimer.

(21) Appl. No.: 12/409,461

(22) Filed: Mar. 23, 2009

(65) Prior Publication Data

US 2010/0074167 A1 Mar. 25, 2010

Related U.S. Application Data

(63) Continuation of application No. 10/319,929, filed on Dec. 12, 2002, now Pat. No. 7,508,785.

(60) Provisional application No. 60/424,205, filed on Nov. 6, 2002.

(51) Int. Cl.
*H04B 7/212* (2006.01)

(52) U.S. Cl.
USPC .......................................................... 370/322

(58) Field of Classification Search
USPC ................ 370/316, 327, 326, 322, 325, 474, 370/480, 401, 429; 455/59, 3.01, 3.02, 3.06, 455/452.2, 428, 12.1, 69, 13.1–13.4; 380/212; 725/114, 138, 111, 129
See application file for complete search history.

(56) References Cited

U.S. PATENT DOCUMENTS 6,137,807 A * 10/2000 Rusu et al. ..................... 370/429
6,603,747 B2 * 8/2003 Asai .............................. 370/322

(Continued)

*Primary Examiner* — Mark Rinehart
*Assistant Examiner* — Mohammad Anwar
(74) *Attorney, Agent, or Firm* — Garlick & Markison; Kevin L. Smith (57) ABSTRACT

In a DOCSIS based satellite gateway data is transmitted over a single downstream channel, at different throughput rates. Data destined for each subscriber/receiver is assigned a throughput rate depending upon the downstream signal quality of that subscriber/receiver. To accomplish this, the downstream DOCSIS MAC data is parsed to extract DOCSIS packets. The DOCSIS packets are then loaded into packet queues based on an identifier within such packets such as the MAC destination address or SID. Each of the queues represents a bandwidth efficiency or throughput rate that can be currently tolerated by specific subscribers based on the current signal quality being experienced at the subscriber location. A PHY-MAP describing the downstream data structure to be transmitted and inserted into the downstream data. Data is extracted from the packet queues in queue blocks as defined by the PHY-MAP. The queue blocks are modulated with transmission parameters appropriate for each queue block and transmitted to the DOCSIS based satellite modems. The satellite modems extract the PHY-MAP from the downstream data and use the information contained in it to demodulate and decode the queue for which they have sufficient downstream signal quality. Satellite modems measure and transmit downstream signal quality to the satellite gateway to be used to assigned traffic to the appropriate queues.

20 Claims, 8 Drawing Sheets

U.S. PATENT DOCUMENTS 6,891,858 B1 * 5/2005 Mahesh et al. ................ 370/480
7,508,785 B2 * 3/2009 Dale et al. ..................... 370/322
2002/0154620 A1 * 10/2002 Azenkot et al. ............... 370/347

* cited by examiner

FIG. 7
(Queuing Example)

FIG. 8
(Multi-rate MPEG Stream showing Queue Block Structure)

DOWNSTREAM TIME DOMAIN BASED ADAPTIVE MODULATION FOR DOCSIS BASED APPLICATIONS

CROSS REFERENCES TO RELATED APPLICATIONS

The present U.S. Utility patent application claims priority pursuant to 35 U.S.C. §120, as a continuation, to the following U.S. Utility patent application which is hereby incorporated herein by reference in its entirety and made part of the present U.S. Utility patent application for all purposes:

1. U.S. Utility application Ser. No. 10/319,929, entitled "Downstream Time Domain Based Adaptive Modulation for DOCSIS Based Applications," filed Dec. 12, 2002, now issued as U.S. Pat. No. 7,508,785, which claims priority pursuant to 35 U.S.C. §119(e) to the following U.S. Provisional Patent Application which is hereby incorporated herein by reference in its entirety and made part of the present U.S. Utility Patent Application for all purposes:

a. U.S. Provisional Application Ser. No. 60/424,205, entitled "Wireless Headset having Integrated Headset Processor," filed Nov. 6, 2002.

SPECIFICATION

1. Technical Field

This invention relates to broadband communication systems, and more particularly those that use the Data Over Cable Service Interface Specification (DOCSIS) media access protocol or its derivatives.

2. Related Art

Communication systems are known to support wireless and wire lined communications between wireless and/or wire lined communication devices. Such communication systems range from national and/or international cellular telephone systems, to the Internet, to cable systems, to local area networks (LANs), to wide area networks (WANs) to in-home wireless networks and the like. Often, these systems are comprised of numerous different forms of transmission media.

In the example of two-way data communications via satellite, data may be transmitted using time division multiplexing (TDM) over a single carrier (i.e. channel). A gateway receives data from a network such as the Internet, performs forward error correction (FEC) then modulates the data. The data is transmitted up to a satellite and back down from the satellite to one or more receivers.

For each communication device to participate in communications of whatever type, it includes or is coupled to a transceiver (i.e., for terrestrial wireless, a radio receiver and transmitter; and for two-way satellite, a satellite receiver and transmitter). As is known, the transmitter of radio and satellite transceivers include a data modulation stage, one or more intermediate frequency stages, and a power amplifier. The data modulation stage converts raw data into baseband signals in accordance with the particular wireless or satellite communication standard. The one or more intermediate frequency stages mix the baseband signals with the signal generated by one or more local oscillators to produce RF signals. The power amplifier amplifies the RF signals prior to transmission via an antenna or satellite dish.

As is also known, the receiver of a transceiver is also coupled to the antenna or satellite dish and includes a low noise amplifier, one or more intermediate frequency stages, a filtering stage, and a data recovery (i.e. demodulation) stage. The low noise amplifier receives an inbound RF signal via the antenna or satellite dish and amplifies it. The one or more intermediate frequency stages mix the amplified RF signal with the signal generated by one or more local oscillators to convert the amplified RF signal into a baseband signal or an intermediate frequency (IF) signal. This is typically referred to as frequency down-conversion. The filtering stage filters the down-converted baseband or IF signal to eliminate unwanted out of band signals to produce a filtered signal that is only that which falls within the bandwidth of the selected channel. Thus, this filter is sometimes referred to as a channel select filter. The data recovery or demodulation stage recovers raw data from the filtered signal in accordance with the particular wireless or satellite communication standard.

One common data network architecture, specified as the Data Over Cable Service Interface Specification) DOCSIS[1], originated with cable operators interested in deploying high-speed packet-based communications systems on cable television systems. These include IP based Internet data, packet telephony service, video conferencing service, and many others. The goal of DOCSIS is to define a data service that will allow transparent bi-directional transfer of Internet Protocol (IP) traffic between a cable system headend or Cable Modem Termination System (CMTS) and customer locations using a cable modem (CM), over an all-coaxial or hybrid-fiber/coax (HFC) cable network.sup.1 The DOCSIS Radio Frequency Interface Specification SP-RFIv1.1-109-020830 is publicly available from and is hereby incorporated herein by this reference for all purposes.

The DOCSIS Radio Frequency Interface Specification SP-RJIv1.1-109-020830 is publicly available from and is hereby incorporated herein by reference for all purposes.

The DOCSIS Media Access Control (MAC) sublayer specifies that the CMTS provide a single carrier transmitter for each downstream (i.e. from head-end to subscriber) channel. All CMs at subscriber locations listen to all frames transmitted on the downstream channel upon which they are registered and accept those frames where the destinations match the CM itself or CPEs (customer premises equipment). CMs can communicate with other CMs only through the CMTS.

The upstream channel is thus characterized by many transmitters (CMs) and one receiver (the CMTS). Time in the upstream channel is slotted, providing for Time Division Multiple Access at regulated time ticks. The CMTS provides the time reference and controls the allowed usage for each interval. Intervals may be granted for transmissions by particular CMs, or for contention by all CMs. CMs may contend to request transmission time. To a limited extent, CMs may also contend to transmit actual data. In both cases, collisions can occur and retries are then used.

The DOCSIS protocol has been adapted to other types of media, including terrestrial fixed wireless and two way satellite. For these applications, as well as the original data over cable service, data is transferred between a central location and many remote subscribers. The term for the centrally located equipment for broadband terrestrial fixed wireless systems is a Wireless Access Termination System (WATS). The subscriber equipment is called a wireless modem. With respect to two way satellite, the centrally located equipment is a satellite gateway (SG), while the subscriber equipment is a satellite modem (SM). Those of average skill in the art will recognize that in each of these types of service, the DOCSIS architecture is substantially maintained, even if some of the implementation details are adapted to the type of media used for transmission.

In standard DOCSIS based systems such as those described above, the downstream transmission is defined to be a time division multiplexed (TDM) signal with a fixed modulation type as well as a fixed forward error correction (FEC) coding rate. Thus, by nature the downstream signal has a fixed spectral efficiency in bits per second/Hertz [bps/Hz]. Signal parameters such as the modulation type, FEC coding type, and FEC coding rate determine the minimum signal to noise ratio (SNR) that must be present for the SM to have error-free or quasi error-free operation in a given channel having those parametric limitations. Thus, there is an inherent trade-off between the values of receiver parameters that yield a high level of throughput (e.g. high-order modulation and high FEC code rates) and those values (e.g. low-order modulation and more robust but lower FEC code rates) that ensure that the signal can be reliably received under conditions of low SNR but with lower throughput.

In many real world environments, subscribers of such systems experience a wide range of path losses and channel degradations. One example is a satellite based system where a downstream spot beam broadcasts to SMs that are located over a wide geographic area. Various conditions such as localized rainfall, partial obstructions, antenna misalignments, etc. can significantly degrade the signal power levels (and thus SNRs) received by individual subscribers. Those of average skill in the art will recognize that similar channel degradation may be experienced for subscribers of terrestrial fixed wireless and even data over cable, although the causes may be different.

Figure 1:
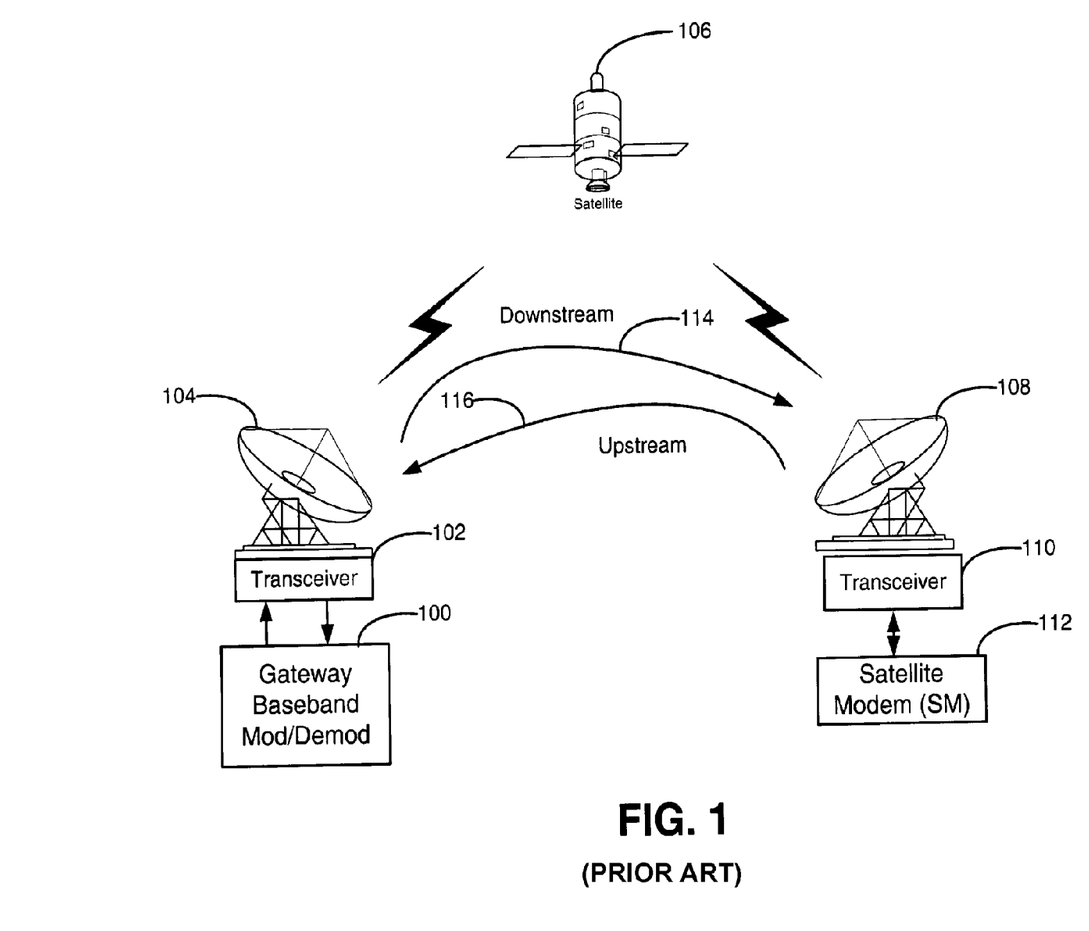
FIG. 1 illustrates the basic elements of a two way satellite data system.

FIG. 1 illustrates the basic elements of a two-way satellite system. A satellite gateway (SG) with a baseband modulator/demodulator 100 receives data from a network, such as the Internet. The data is assembled into an appropriate format in accordance with, for example the DOCSIS architecture previously described, and is then provided to transceiver 102. The transceiver performs certain functions necessary for transmitting the data using the satellite dish 104, up to the satellite 106 and down to a plurality of SMs 112 over downstream channel 114. The downstream signal is received by the dish 108, processed by the transceiver 110, and demodulated by SM 112. The SMs 112 transmit data, generated by the customer premise equipment (CPE) (not shown) back to the SG 100 over the upstream channel 116 uses the format recognized by the SG 100.

Figure 2:
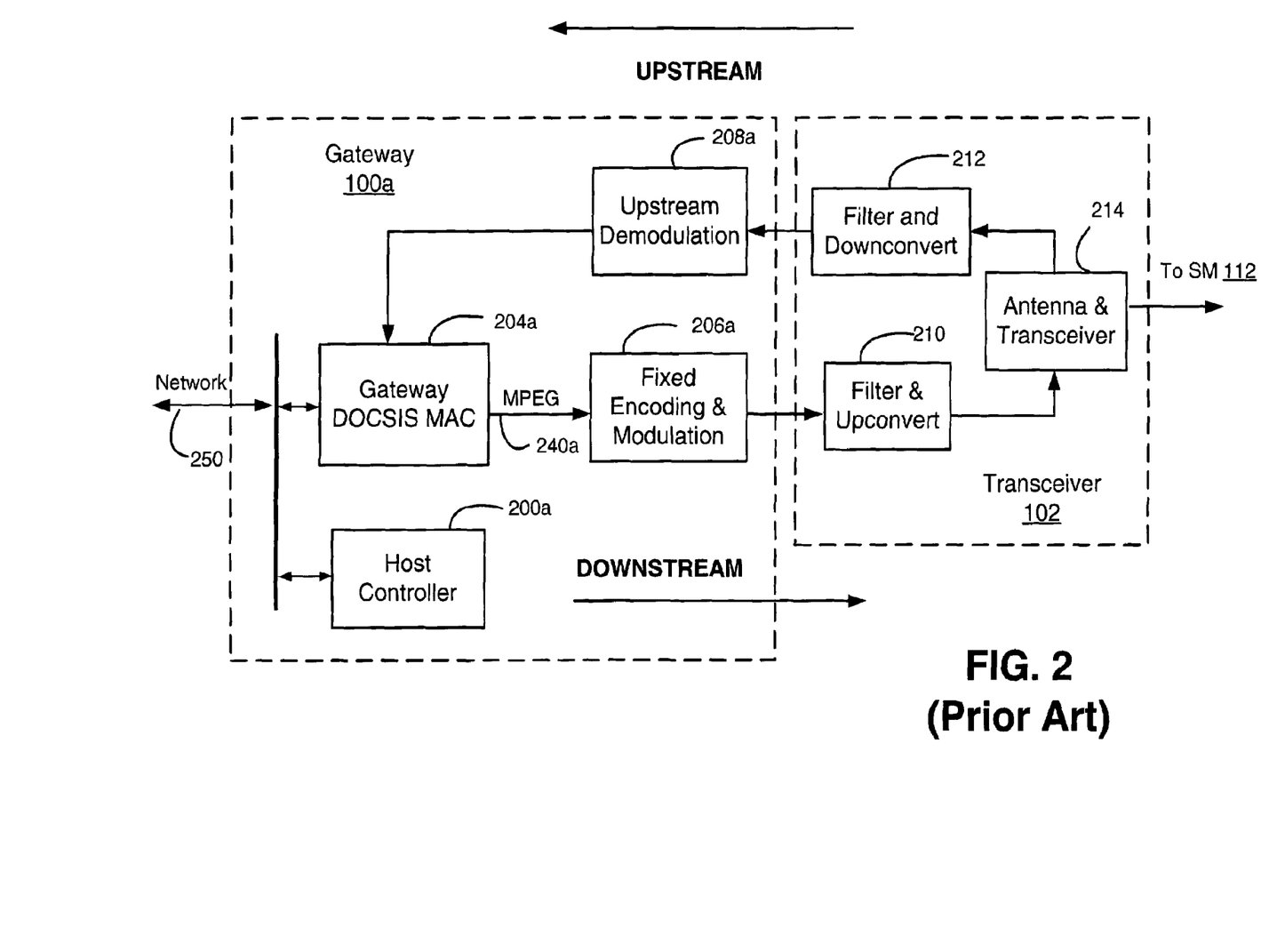
FIG. 2 is a block diagram illustrating the processing blocks of a known satellite gateway (SG)

FIG. 2 is a block diagram illustrating the processing blocks of a known SG 100a, along with the processing blocks of the transceiver 102. Data from a network 250, such as the Internet, is transmitted between the network and the gateway DOCSIS MAC 204a. The data is formatted in accordance with the DOCSIS protocol. This protocol uses an MPEG format in the "downstream transmission convergence sublayer" that serves as the interface between the MAC and physical layer (PHY). MPEG specifications are publicly available and are incorporated herein by this reference for all purposes.

The downstream MPEG data stream that is output at 240a from the MAC 204a is encoded and modulated using a single type of modulation and a single set of FEC parameters by the fixed encoding and modulation stage 206a. The modulated and encoded MPEG stream is then up converted and filtered, and then fed into a high power amplifier by transceiver 214. This signal is transmitted continuously in a single frequency band, through a satellite (106, FIG. 1) and received by subscriber SMs (112, FIG. 2).

The SG 100a also receives (i.e. at antenna dish 104, FIG. 1) the upstream signal transmitted by subscriber satellite modems SM 112 of the system. The signal is filtered and down converted back to baseband at stage 212 using a fixed set of demodulation and decoding parameters at stage 208a to recover the upstream data stream.

Figure 3:
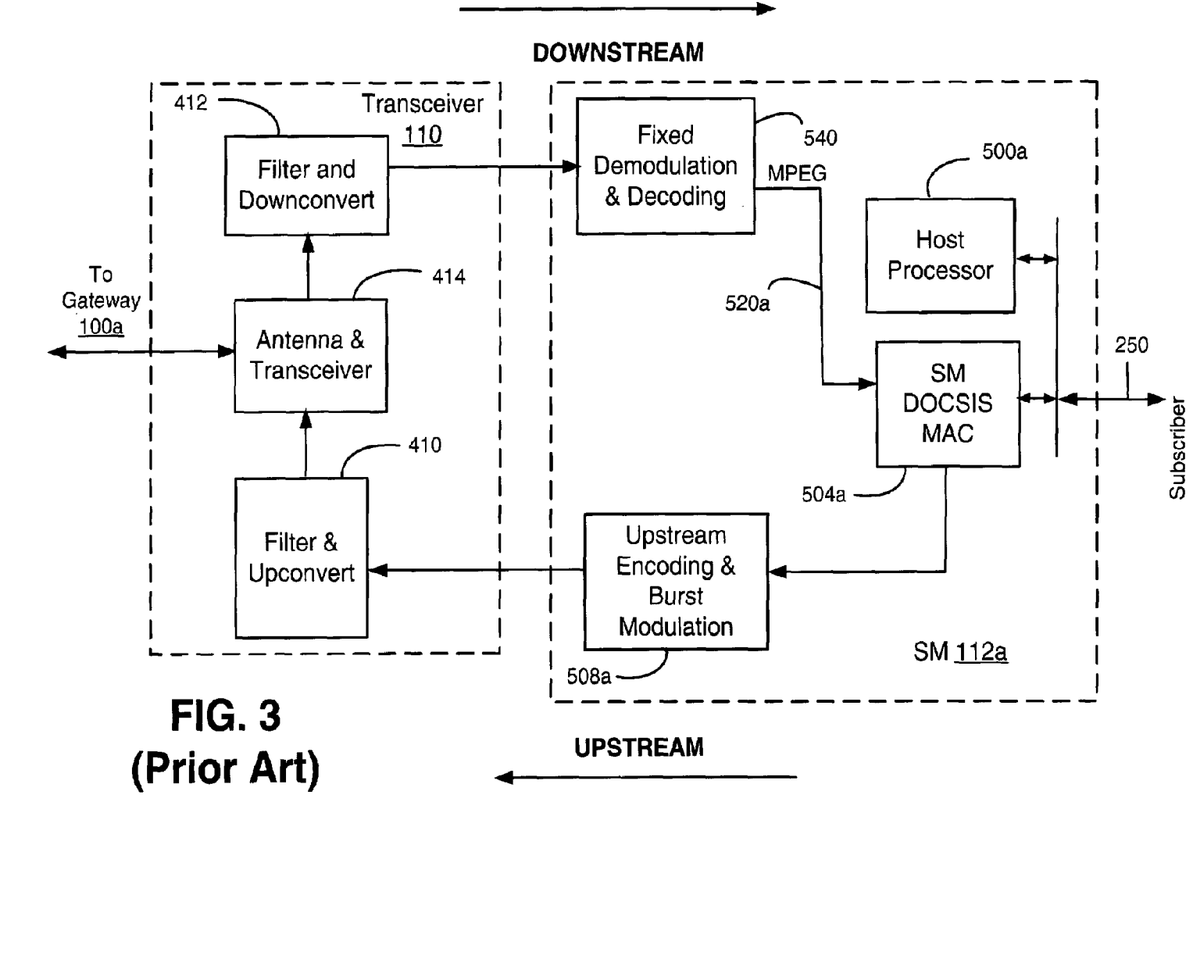
FIG. 3 is a block diagram illustrating the processing blocks of a known satellite modem (SM)

FIG. 3 is a block diagram illustrating the processing blocks of a known SM 112a, along with the processing blocks of the transceiver 110. The SM 112a receives the signal through dish 108 and down converts the signal using a fixed set of demodulation and decoding parameters to recover the MPEG stream at processing box 540. The information is processed by the local DOCSIS MAC 504a in conjunction with the host processor 500a. The data is then passed on to the CPE of the subscriber at line 250.

Note that the modulation type and the FEC encoding parameters are fixed for all data transmitted by the SG 100a and received by each SM 112a over the downstream channel of the system of FIGS. 2 and 3. Indeed, to ensure that customers do not experience total loss of service under conditions of low SNR, current DOCSIS based systems must operate with channel parameters (and therefore fixed modulation and FEC encoding parameters) that ensure that even the subscriber situated the worst in terms of signal degradation (as manifested by bit error rate or SNR) is able to obtain service with a high probability of success. As a result, the majority of subscribers that could otherwise receive data at a higher rate are penalized by the presence of the relatively fewer environmentally disadvantaged subscribers.

SUMMARY

The present invention is directed to apparatus and methods of operation that are further described in the following Brief Description of the Drawings, the Detailed Description, and the Claims. Other features and advantages of the present invention will become apparent from the following detailed description of the invention made with reference to the accompanying drawings.

BRIEF DESCRIPTION OF THE DRAWINGS

The Downstream Adaptive Modulation (DS-AM) method and apparatus of the invention may be better understood, and its numerous objectives, features, and advantages made apparent to those skilled in the art by referencing the accompanying drawings. The use of the same reference number throughout the several figures designates a like or similar element.

DETAILED DESCRIPTION

A satellite communication system implements downstream adaptive modulation that allows subscribers receiving the downstream channel with a higher SNR and/or operating in less degraded channels to achieve higher bandwidth efficiency. This results in a combination of improved channel capacity, increased throughput, and improved coverage.

An embodiment of the method independently and adaptively controls the throughput rate of data traffic destined for each of a plurality of receivers. First, a number of packet queues are defined. Each packet queue is associated with a unique set of transmission parameters. For example, the most robust queue could be defined as using QPSK modulation with a FEC code rate of ½. This queue has relatively low throughput but also requires a very low SNR received at the SM. The least robust queue could be defined with 16 QAM modulation and a FEC code rate of ¾ for example. This queue has a much higher throughput, but also requires higher received SNR to achieve low error rate performance. Using this technique, a number of packet queues are defined, each of which meets respective downstream signal quality requirements. The plurality of packet queues is spaced rationally across a range that corresponds to an expected operating range of the SMs in the system.

The data traffic is assigned to a queue based on the downstream signal quality information for each of the subscribers. This information is measured by each SM and transmitted back to the SG in the upstream channel. Downstream signal quality is periodically updated to reflect the possibility of changing channel conditions for each subscriber. Knowledge of the downstream signal quality for each SM allows the SG to assign the traffic for each SM to the proper packet queue. Overall efficiency is maximized when traffic for each subscriber is placed in the queue that has the highest throughput that can be supported by the downstream signal quality of the SM in question. However, if necessary traffic can be placed in or moved to a more robust packet queue and still be received by the SM.

Data is extracted from each packet queue in queue blocks (QBs) that have a known size and duration. Each of these QBs must be modulated with the transmission parameters associated with the originating packet queue. Each SM configures its demodulation parameters to receive the QBs that its downstream signal quality allows it to receive. The SG must communicate the data structure (i.e., the type, order and number of each QB) to both the downstream modulator (at the SG) and the SM.

The SG communicates this information to the SM via a PHY-MAP control message. This message must be receivable by all SMs, and must specify the parameters required to demodulate and decode the downstream data. At the SG, the modulator can use the PHY-MAP to set the required transmission parameters for each QB, or other control information can be generated and used.

In an adaptive modulator controller, a DOCSIS MAC receives network data such as IP data and produces a number of DOCSIS packets. These packets are placed directly into the packet queues, or framed into the traditional MPEG stream specified by the DOCSIS downstream transmission convergence layer specification. If the MPEG stream is used, a parser extracts the DOCSIS packets and places them in a number of packet queues. Each packet queue represents particular throughput rate or bandwidth efficiency. The more bandwidth efficient, the less tolerant the transmission is of degraded signal at the downstream receiver. The traffic is assigned to each of the receivers based on its current signal quality. Data is formed into queue blocks and each queue block is transmitted with the transmission parameters assigned to the given queue. A PHY-MAP is transmitted in the downstream data to give the SMs knowledge of the downstream data structure. Each SM decodes the PHY-MAP and demodulates the queue blocks with transmission parameters appropriate for that queue block. In general, some SMs will be unable to decode certain queue blocks due to downstream signal quality requirements that are higher than that be experienced by the given SM. The SG endeavors not to place traffic for a given SM in a queue block that it cannot receive. It accomplishes this task with knowledge of the downstream signal quality for each SM that is reported to it via the upstream channel.

Figure 4:
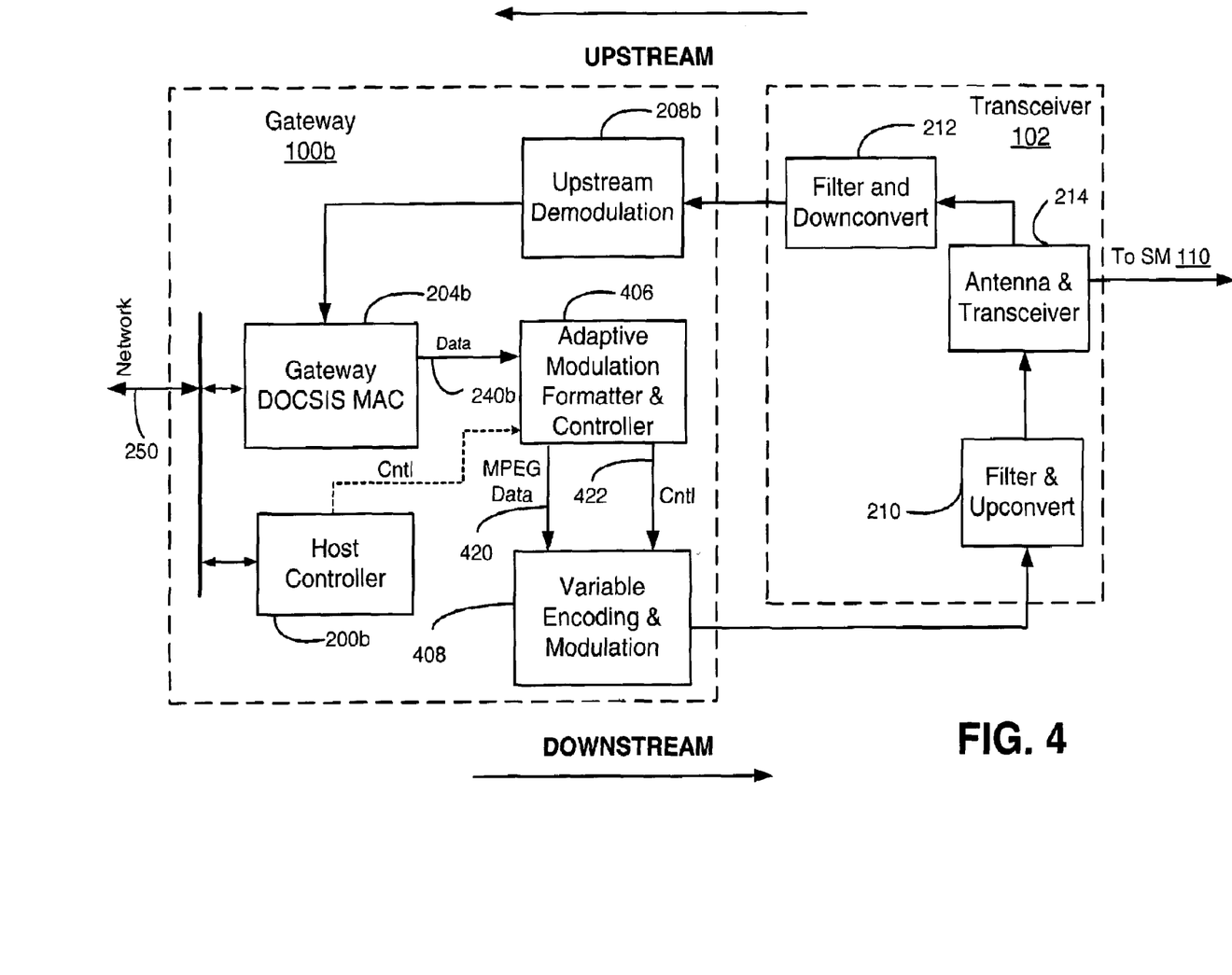
FIG. 4 is a block diagram illustrating the processing blocks of an embodiment of a satellite gateway (SG) 100b, that incorporates the Downstream Adaptive Modulation (DS-AM) method and apparatus of the invention.

Referring to the figures, FIG. 4 is a block diagram illustrating the processing blocks of an embodiment of a satellite gateway (SG) $100b$ that incorporates the Downstream Adaptive Modulation (DS-AM) method and apparatus of the invention. The SG $100b$ includes an adaptive modulation and formatting and control (AMFC) stage 406 that receives and processes the DOCSIS encapsulated traffic received from the MAC processing block $204b$. Interface $240b$ could be a MPEG data stream compliant with the DOCSIS downstream transmission convergence sublayer, or it could have an alternative format. The SG $100b$ also includes a variable encoding & modulation stage 408, which is a modulator that is capable of having its modulation type and FEC encoding parameters dynamically controlled on a QB by QB basis.

Figure 5:
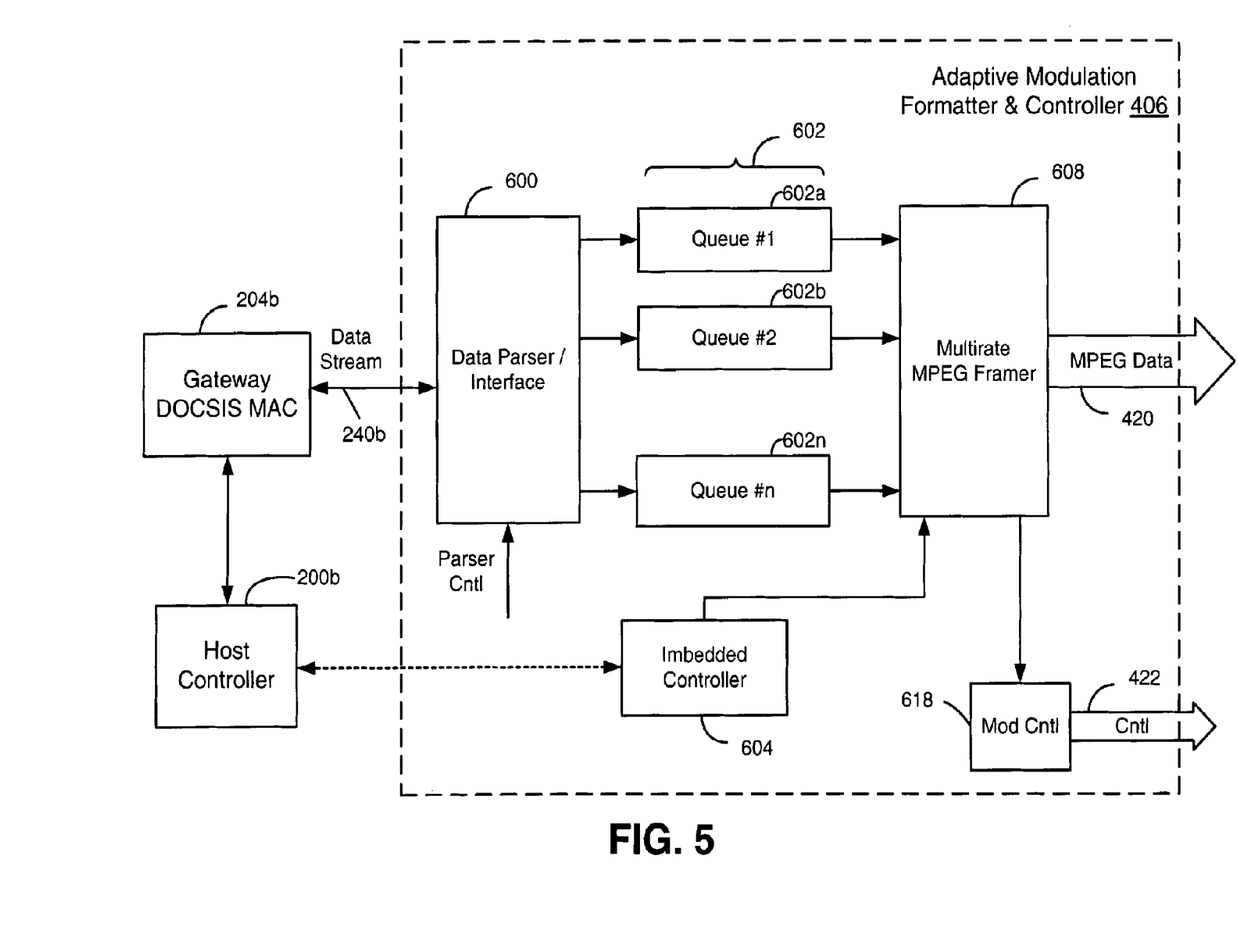
FIG. 5 illustrates a block diagram of the adaptive modulation formatter & controller (AMFC) of FIG. 4.

FIG. 5 illustrates a block diagram of the AMFC block 406 of FIG. 3. The host controller $200b$ receives downstream signal quality information for each of the particular SMs $112b$ over the upstream channel. The SM $112b$ is an embodiment of a satellite modem that is operable to receive and decode downstream transmissions from the SG $100b$ that have been adaptively modulated and encoded using the DS-AM method and apparatus of the invention. The SM $112b$ will be discussed in more detail below.

The downstream signal quality for each SM $112b$ can be based on, for example, the SNR, packet or code word error rate, or other parameters defining signal quality. The SM $112b$ can be made to monitor that information continuously, so that any changes in the signal quality may be dynamically reflected at the SG $100b$. Different sets of transmission parameter profiles (including values for modulation type, FEC type and FEC rate) are defined spanning the range of expected signal quality. An example of a set of four profiles based on SNR as a signal quality measurement are shown below in Table 1. As Table 1 illustrates, the profiles trade-off higher throughput (shown as higher bandwidth efficiency in Table 1) for higher required signal quality. Clearly, Table 1 is only a hypothetical example. Other profiles with different performance characteristics and different transmission parameters could be specified while staying within the scope of the invention.

TABLE 1

Example of Transmission Parameter Profiles for DS-AM

| Profile | Mod | FEC Rate | BW Eff [bits/sec/Hz] | Required SNR |
|---|---|---|---|---|
| 1 | QPSK | ½ | 1.0 | 3.0 |
| 2 | QPSK | ¾ | 1.5 | 6.0 |
| 3 | 8 PSK | ⅔ | 2.0 | 9.0 |
| 4 | 16 QAM | ¾ | 3.0 | 12.0 |

The host controller $200b$ assigns each of the different profiles to one or more of the queues 602. Put another way, each packet queue 602 is associated with a unique modulation order and/or FEC code rate that defines a throughput rate in the form of bandwidth efficiency (i.e. bits per second per 1 Hz of bandwidth. Traffic for a given SM 112*b* is then assigned to a specific queue or set of the queues 602 having an assigned profile that is appropriate for the downstream quality information provided by that SM 112*b*. Sufficient information is associated with each packet to allow it to be assigned to the proper queue. For example, the packets can be assigned to the different queues 602 by means of the DOCSIS Destination Address (DA), Service ID (SID), or any other unique identifier that is available with the DOCSIS protocol.

Figure 7:
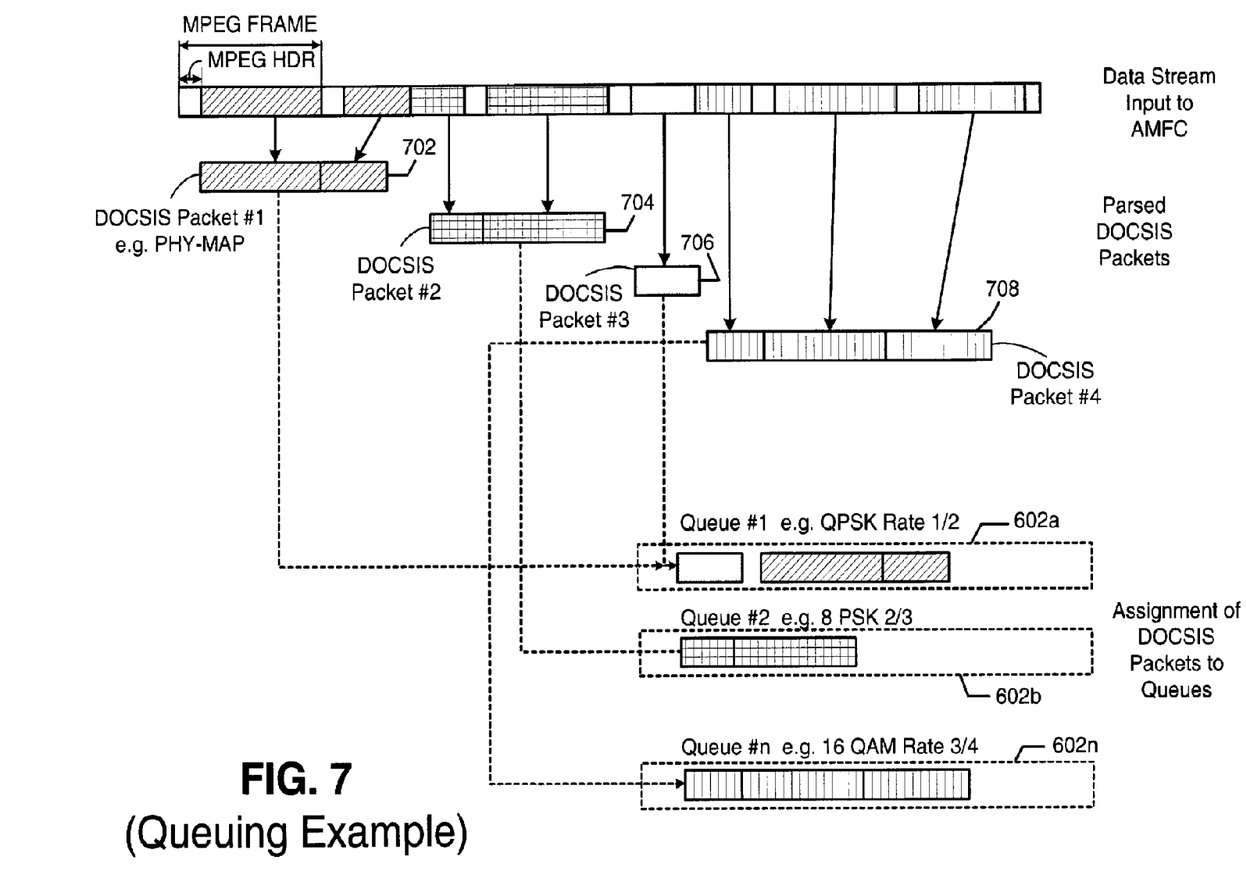
FIG. 7 illustrates a queuing example given a MPEG data stream input to the AMFC.

The adaptive modulation formatter & controller block 406 receives the data stream 240*b* from the Gateway MAC 204*b*. DOCSIS packets destined for individual SMs 112*b* are parsed and placed in their assigned packet queues 602. One possible format for the data interface between the Gateway MAC 204*b* and the AMFC 406 is an MPEG format. FIG. 7 illustrates the DOCSIS packets of the data stream 240*b* residing in a MPEG format. As shown, four DOCSIS packets are overlaid on the MPEG format. Each MPEG frame has a length of 188 bytes. The example in FIG. 7 shows as the first packet PHY-MAP and hence as input externally to the AMFC 406. In alternate implementations, the PHY-MAP could be generated internally in the AMFC 406. The parser 602 is able to extract the DOCSIS packets 702, 704, 706 and 708 from the MPEG stream, and based on their DOCSIS destination addresses or other unique identifier rout them to their assigned packet queues 602*a*-602*n*. In this case, it is assumed that DOCSIS packets #1, 702 and #3 706 are assigned to packet queue 602*a*, while packet #2 704 is assigned to queue 602*b* and #4 708 is assigned to the last packet queue 602*n*.

The profiles for the various queues are defined by their transmission parameters. These parameters include, but are not necessarily limited to: the modulation type, FEC type, FEC rate, FEC block size, and QB size (or equivalently number of MPEG frames per QB). The example in FIG. 7 illustrates profiles that are defined by QPSK modulation with a rate ½ code (queue 602*a*), 8-PSK modulation with a rate ⅔ code (queue 602*b*) and 16 QAM modulation with a rate ¾ code (queue 602*n*). As discussed, the profile parameters are defined to accommodate the system performance objectives and downstream signal quality requirements. They would ideally be based on traffic signal quality conditions experienced by the subscribers. In the example of FIG. 7, queue 602*a* has a profile that is typically used for a worst case signal to noise ratio, as the order of the modulation type is low and the error correction code rate is only one bit of two being payload, and every other bit being a parity bit. While the bandwidth efficiency is quite low for this combination, it produces a very robust transmission even in worst case signal conditions. The profile for Q #2 is somewhat better in bandwidth efficiency, and is more suitable for receivers or subscribers that are experiencing better SNR ratios. The least robust queue (queue 602*n*) has the highest bandwidth efficiency, but also requires the highest downstream signal quality.

As previously discussed, a worst case queue guarantees that DOCSIS MAC management type messages, or that the current configuration of the PHY-MAP has been received by all receivers. This is crucial for the proper operation of SM 112*b* receivers. They must all know how the downstream data stream has been formatted at any given time for proper demodulation and decoding of the downstream data. There is an inherent cost/benefit trade-off in selecting the size of the queue blocks. Large Q blocks tend to facilitate more efficient mapping of data packets and provides the opportunity for more effective interleaving to spread errors. Shorter packets minimize latency and facilitate a more exact match between the traffic conditions and the proportion of capacity assigned to each queue.

This description of the downstream data structure (i.e. the number and type of each queue block transmitted) are stored in PHY-MAPs. The PHY-MAP spans a known time period and contains the information necessary for the SMs to determine the sequence of queue blocks arriving in the downstream and hence to demodulate and decode each queue block that it is capable of receiving (i.e. the SM receives the queue blocks for which it has the required downstream signal quality). The PHY-MAP can also contain information that defines start times of bursts from each queue 602 to which each profile is assigned, and the duration in the number of QBs. PHY-MAPs span a finite period of time and are inserted into the downstream and transmitted periodically Thus, the relative time allocated for transmission of each queue 602 can be dynamically changed in the PHY-MAPs to optimize overall system throughput and maximize efficiency. For example, if a very large rain storm affects a large number of subscribers, the low throughput, more robust queue may become full more quickly than the other queues. Similarly, if it is extremely clear and sunny, the higher through rate (i.e. higher bandwidth efficient) queues may become fuller faster. In this case, the controller 604 can sense this and increase the size and/or number of the QBs that define a burst from a queue. The structure of the PHY-MAP is not critical and can be determined by the host processor 200*b*, the embedded controller 604, or other external entity that has knowledge of the traffic statistics, and signal quality distribution of the SMs 112*b*.

The imbedded controller 604 provides control information to the MPEG Framer 608 based on the PHY-MAP profile information for each packet queue 602, and packet data is thereby extracted from the packet queues 602 and framed according to the profile definitions in the PHY-MAP. Modulation control can be achieved by sending the PHY-MAP to the Variable Encoding & Modulation block 408 of FIG. 4. Alternately, the modulation control could be a separate processing block that provides modulation control information (as shown as 618 in FIG. 5). Regardless of the specific implementation, modulation control must be provided to the Variable Encoding & Modulation block 408 such that each queue block is transmitted with the proper transmission parameters.

Figure 8:
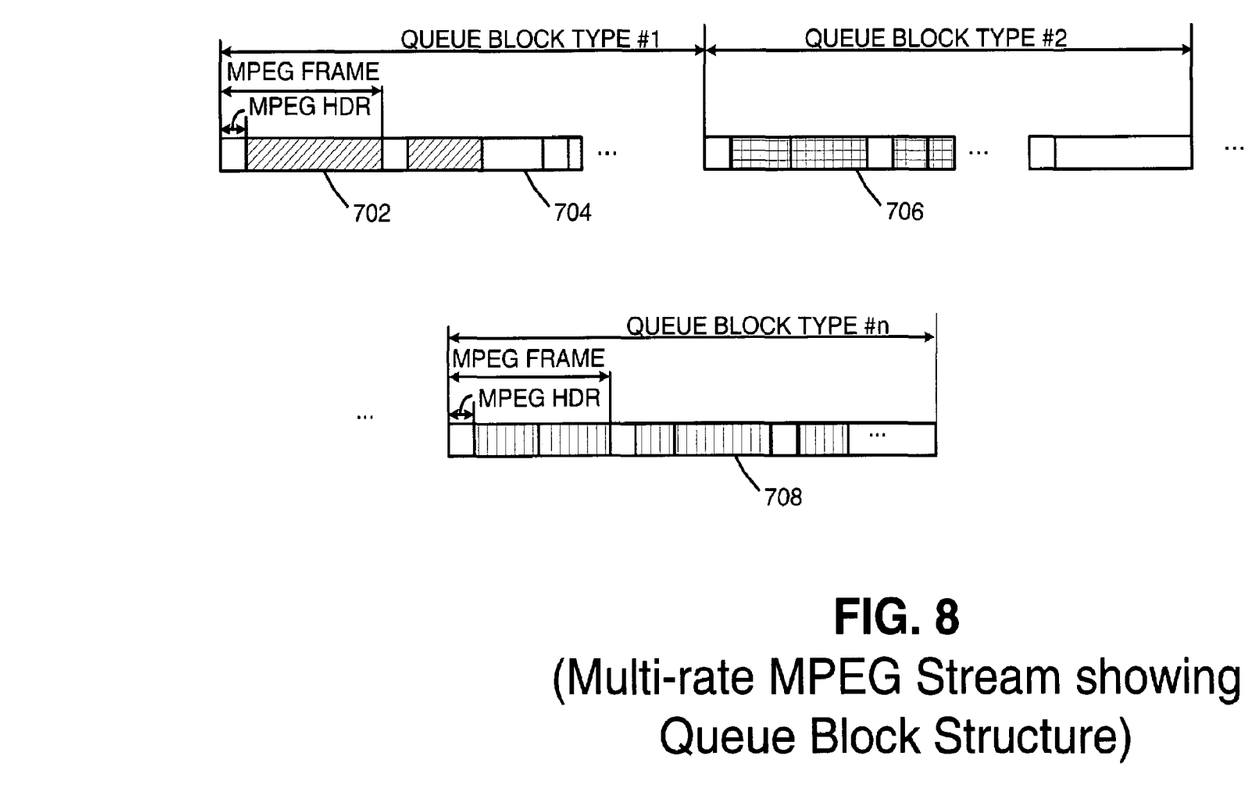
FIG. 8 illustrates an example output the AMFC based on the profile established for the packet queue in FIG. 7.

FIG. 8 illustrates an output 420 of MPEG framer 608 based on the profile established for the queues 602*a*, 602*b*, and 602*c* of FIG. 7. The output starts out with the PHY map message 702 destined for all of the receiver/subscribers (in this example, packet 702 is interpreted to be the PHY-MAP). As shown, the PHY-MAP is included in a queue block having the most robust transmission parameters. From information in the PHY-MAP, the SMs will know the map of the content of the downstream they are receiving and therefore how to decode and demodulate it. Queue blocks are transmitted in accordance with the sequence defined by the PHY-MAP. In the example shown in FIG. 8, this sequence includes a QB from queue 602*a*, a QB from queue 602*b*, and a queue block from queue 602*n*. These QBs contain the example DOCSIS packets 704, 706 and 708. DOCSIS time stamps or other MAC messages would be included in queue 602*a* (the most robust queue). The QBs are provided to the variable encoding and modulation stage (408, FIG. 4) over output 420. The modulation control signals can be embedded in 420, or implemented as a separate interface 422 (or some combination of the two approaches).

As previously mentioned, any data transmitted for all SMs 112*b* to receive must be processed through the packet queue 602 with the most robust profile (and therefore the lowest throughput to ensure that even the most degraded SMs 112b are able to receive the messages. This includes the PHY-MAP itself, which all SMs 112b must receive and utilize to properly decode the downstream data. The SMs must know the profiles for each frame of data coming in, so that it can adaptively apply the correct demodulation and error decoding to the received data on a QB by QB basis. Other such messages that must be transmitted through the most robust queue 602 include all DOCSIS timestamps, DOCSIS MAC management messages and all other multi-cast data.

Figure 6:
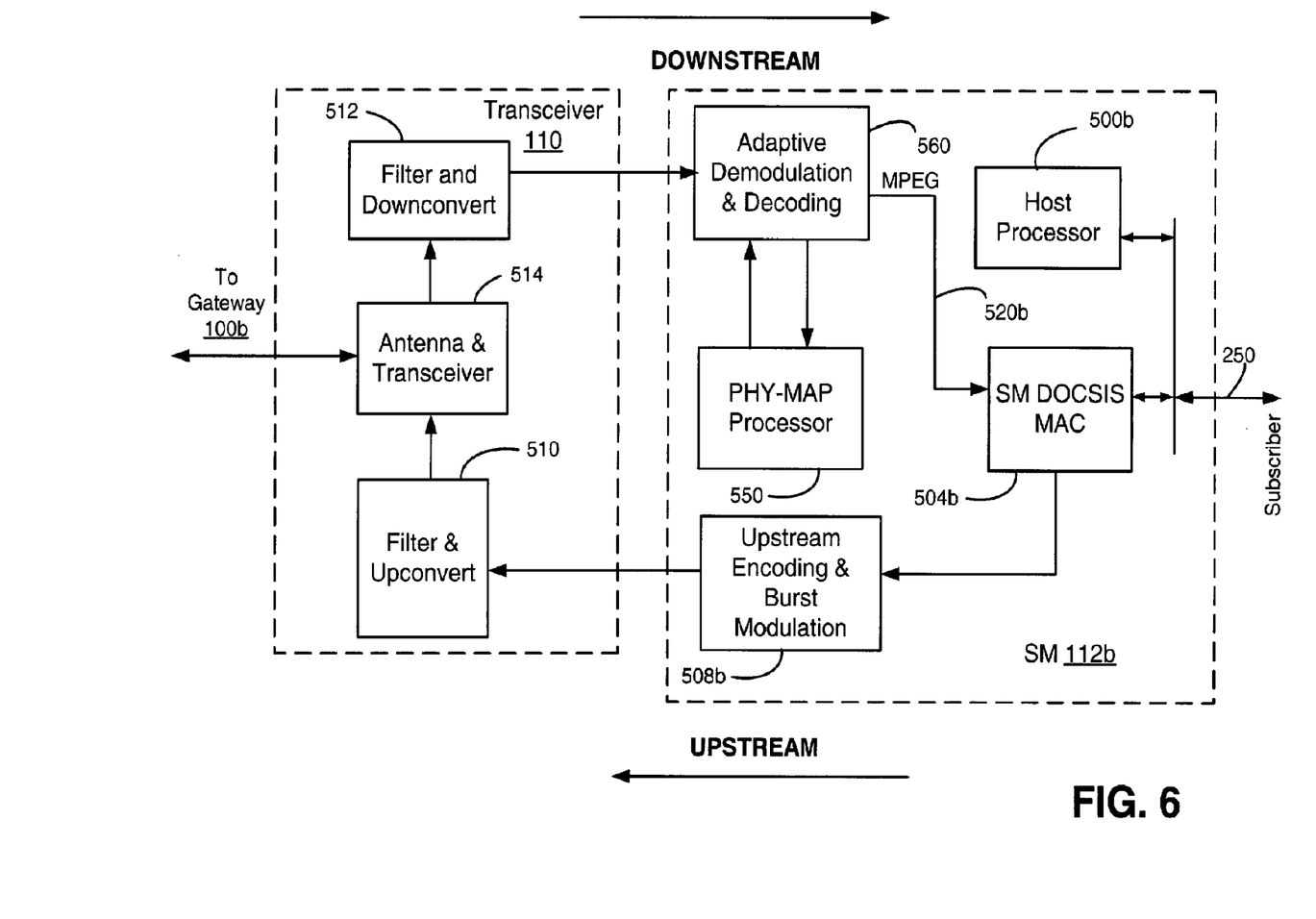
FIG. 6 is a block diagram illustrating the processing blocks of an embodiment of a satellite modem (SM), which incorporates the DS-AM method and apparatus of the invention.

As previously discussed, the SMs 112b must be able to decode and demodulate the adaptively modulated stream. FIG. 6 is a block diagram illustrating the processing blocks of an embodiment of a satellite modem (SM) 112b, which incorporates the DS-AM method and apparatus of the invention. The adaptive demodulation and decoding block 560 decodes the PHY-MAP message (702, FIG. 8) sent from the Gateway (SG 100b). This message is used to determine the proper demodulation and decoding parameters to use during the proper time intervals (i.e. for each QB). The SM 112b always decodes and demodulates the most robust data packet queue to extract the timestamp and MAC management messages sent to all SMs 112b.

The SMs 112b use the MAC management messages to set up an upstream channel to the GM 100b. SM 112b uses this upstream channel to send downstream signal quality metrics to the host of the SG 100b. This could be implemented as part of the ranging and registration process common to these systems or as separate MAC messages. Based on its signal quality, each SM 112b identifies the maximum downstream throughput rate that it can handle with acceptable fidelity, and decodes data received from the packet queue assigned to handle that throughput rate as well as from any queue having a more robust profile. If any packet queue cannot be demodulated by the SM 112b with appropriate fidelity, the SM 112b fills output MPEG frames corresponding to that queue with null MPEG frames, or otherwise blanks the data sent to the SM DOCSIS MAC 504b. The decoded stream is transmitted to the SM DOCISIS MAC 540b over output 520b.

The Gateway SG 100b uses the PHY-MAP for flexible and optimized assignment of QBs to the downstream. As channel conditions or traffic loading changes, the PHY-MAP can be dynamically adjusted to optimize efficiency. Decoding all possible queues by the SM 112b assures that all SMs 112b will receive PHY-MAP messages and multi-cast traffic over the packet queue having the most robust modulation and encoding. It also permits Gateway SG 100b the flexibility to assign traffic destined for a given SM 112b to the queue having the highest possible throughput, or to any of the more robust queues.

Those of average skill in the art will recognize that the DS-AM of the invention can be achieved in the time or frequency domain. While embodiments disclosed herein are time domain implementations, it is contemplated that the principals of the invention as disclosed may be extended to the frequency domain without exceeding the intended scope of the invention. Moreover, those of average skill in the art will recognize although the embodiments disclosed herein within the context of DOCSIS based satellite systems, the method and apparatus of the invention may easily be applied to other types of DOCSIS data systems, such as terrestrial fixed wireless systems and cable modem systems.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (that is, where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that a first signal has a greater magnitude than a second signal, a favorable comparison may be achieved when the magnitude of the first signal is greater than that of the second signal or when the magnitude of the second signal is less than that of the first signal.

What is claimed is:

1. A method of adaptively controlling a throughput rate of data traffic destined for each of a plurality of receivers, the data traffic combined into a single data stream and transmitted over a single downstream channel, the method comprising:
    associating a packet queue of a plurality of packet queues with one of a plurality of throughput rates;
    establishing a plurality of profiles to span a range of expected downstream signal quality information, wherein each of the plurality of profiles includes a modulation type and an error correction encoding rate associated with a throughput rate of the plurality of throughput rates, wherein each of the plurality of packet queues is associated with a profile of the plurality of profiles based upon the one of the plurality of throughput rates;
    selecting the packet queue of the plurality of packet queues based upon the throughput rate of the data traffic;
    parsing the single data stream into the selected packet queue for transmission, wherein a description of a downstream data structure of the single data stream is stored in a PHY-MAP, the description including information for the plurality of receivers to demodulate and decode the data traffic; and
    assigning the PHY-MAP to a lowest throughput rate for transmission of the PHY-MAP to the plurality of receivers.

2. The method of claim 1 wherein the expected downstream signal quality information comprises at least one of:
    a signal-to-noise ratio for the receiver; and
    a packet error rate.

3. The method of claim 1 further comprising receiving the expected downstream signal quality information from each of the plurality of receivers over an upstream signal channel.

4. The method of claim 1 wherein the parsing further comprises placing a packet queue identifier in each traffic packet of the data stream.

5. The method of claim 1 further comprising:
generating the single data stream in accordance with a DOCSIS MAC layer; and
assigning DOCSIS MAC management messages and DOCSIS time stamp messages to the lowest throughput rate.

6. The method of claim 5 further comprising:
extracting packet data from the plurality of packet queues; and
framing the extracted packet data in accordance with the description stored in the PHY-MAP for the each of the plurality of packet queues from which the packet data is extracted and framed.

7. The method of claim 6 further comprises:
generating modulation and encoding control signals for each burst from the selected packet queue of the plurality of packet queues in accordance with the profile associated with the packet queue from which the framed data packet data was extracted.

8. The method of claim 7 further comprising:
updating the PHY-MAP periodically to reflect changes in the expected downstream signal quality information.

9. An apparatus for adaptively controlling a throughput rate of data traffic destined for each of a plurality of receivers, the data traffic combined into a single data stream and transmitted over a single downstream channel, the apparatus comprising:
means for associating a packet queue of a plurality of packet queues with one of a plurality of throughput rates;
means for establishing a plurality of profiles to span a range of expected downstream signal quality information, wherein each of the plurality of profiles includes a modulation order and an error correction encoding rate associated with a throughput rate of the plurality of throughput rates, wherein each packet queue of the plurality of packet queues is associated with a profile of the plurality of profiles based upon the one of the plurality of throughput rates, wherein the associated profiles are stored in a PHY-MAP;
means for selecting the packet queue of the plurality of packet queues based upon the throughput rate of the data traffic;
means for parsing the single data stream into the selected packet queue for transmission;
means for assigning the PHY-MAP to the lowest throughput rate; and
means for transmitting the PHY-MAP to each of the receivers over the downstream channel.

10. The apparatus of claim 9 wherein the expected downstream signal quality information comprises at least one of:
a signal-to-noise ratio; and
a packet error rate.

11. The apparatus of claim 9 further comprising means for receiving the expected downstream signal quality information from each of the plurality of receivers over an upstream signal channel.

12. The apparatus of claim 9 wherein the means for assigning further comprises means for placing a packet queue identifier in each traffic packet of the data stream.

13. The apparatus of claim 9 further comprising:
means for generating the single data stream in accordance with a DOCSIS MAC layer; and
means for assigning DOCSIS MAC management messages and DOCSIS time stamp messages to the lowest throughput rate.

14. The apparatus of claim 9 further comprising:
means for extracting packet data from the plurality packet queues; and
means for framing the extracted packets in accordance with the description stored in the PHY-MAP for the each of the plurality of packet queues from which the packet data is extracted and framed.

15. A method of adaptively controlling a throughput rate of data traffic destined for each of a plurality of receivers, the data traffic combined into a data stream and transmitted over a downstream channel, the method comprising:
associating a packet queue of a plurality of packet queues with one of a plurality of throughput rates;
establishing a plurality of profiles to span a range of expected downstream signal quality information, wherein each of the plurality of profiles includes a modulation type and an error correction encoding rate associated with a throughput rate of the plurality of throughput rates, wherein each packet queue of the plurality of packet queues is associated with a profile of the plurality of profiles based upon one of the plurality of throughput rates;
selecting the packet queue of the plurality of packet queues based upon the throughput rate of the data traffic;
parsing the data stream into the selected packet queue for transmission;
generating the data stream in accordance with a DOCSIS MAC layer; and
assigning DOCSIS MAC management messages and DOCSIS time stamp messages to a lowest throughput rate of the plurality of throughput rates.

16. The method of claim 15 further comprising:
extracting packet data from the plurality of packet queues; and
framing the extracted packets in accordance with a description stored in a PHY-MAP for the each of the plurality of packet queues from which the packet data is extracted and framed.

17. The method of claim 16 further comprises:
generating modulation and encoding control signals for each burst from a selected packet queue of the plurality of packet queues in accordance with the profile associated with the packet queue from which the packet data was extracted.

18. The method of claim 17 further comprising:
updating the PHY-MAP periodically to reflect changes in the expected downstream signal quality information.

19. The method of claim 15 wherein the expected downstream signal quality information comprises at least one of:
a signal-to-noise ratio for the receiver; and
a packet error rate.

20. The method of claim 15 wherein the parsing further comprises placing a packet queue identifier in each traffic packet of the data stream.

* * * * *